(12) United States Patent
Seo et al.

(10) Patent No.: US 11,029,759 B2
(45) Date of Patent: Jun. 8, 2021

(54) HAPTIC MOVABLE DISPLAY FOR SPATIAL CORRELATION

(71) Applicant: International Business Machines Corporation, Armonk, NY (US)

(72) Inventors: Hyun Kyu Seo, New York, NY (US); Mark E. Podlaseck, Kent, CT (US); Jonathan H. Connell, II, Cortland Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 16/135,011

(22) Filed: Sep. 19, 2018

(65) Prior Publication Data

US 2020/0089322 A1  Mar. 19, 2020

(51) Int. Cl.
*G06F 3/03* (2006.01)
*G06F 3/01* (2006.01)
*G06F 3/0481* (2013.01)

(52) U.S. Cl.
CPC .............. *G06F 3/016* (2013.01); *G06F 3/03* (2013.01); *G06F 3/04812* (2013.01)

(58) Field of Classification Search
CPC .. G06F 3/016; G06F 2203/014; G06T 7/0002
USPC ........................................................ 345/419
See application file for complete search history.

(56) References Cited

U.S. PATENT DOCUMENTS

| | | | |
|---|---|---|---|
| 9,279,536 B2 | 3/2016 | Dittmer et al. | |
| 9,298,254 B2 | 3/2016 | Ha et al. | |
| 9,507,420 B2 | 11/2016 | Tartz | |
| 9,524,030 B2 | 12/2016 | Modarres | |
| 9,827,054 B2 | 11/2017 | Richmond et al. | |
| 9,849,595 B2 | 12/2017 | Wang et al. | |
| 9,898,076 B1 | 2/2018 | Shah | |
| 9,997,092 B2 | 6/2018 | Sutherland et al. | |
| 10,346,117 B2 | 7/2019 | Sylvan | |
| 2010/0053304 A1* | 3/2010 | Underkoffler | G06F 3/017 348/42 |
| 2011/0147546 A1 | 6/2011 | Monsalve et al. | |
| 2014/0247240 A1* | 9/2014 | Sinclair | G06F 3/0414 345/174 |
| 2015/0327379 A1 | 11/2015 | Prunty et al. | |
| 2017/0118447 A1 | 4/2017 | Huang et al. | |
| 2017/0301088 A1* | 10/2017 | Bharat | A61B 34/20 |

(Continued)

OTHER PUBLICATIONS

Brooks, Jr. et al., "Project GROPE—Haptic-Displays for Scientific Visualization", SIGGRAPH '90, Dallas, Aug. 6-10, 1990, Computer Graphics, vol. 24, No. 4, Aug. 1990, ACM-0-89791-344-2/90/008/ 0177, © 1990, 9 pages.

(Continued)

*Primary Examiner* — Thomas J Lett
(74) *Attorney, Agent, or Firm* — Haley J. McClory

(57) ABSTRACT

Embodiments of the present invention provides methods, computer program products, and a system for determining and displaying an image selected from a plurality of images based on a physical displacement of a device. Embodiments of the present invention can be used to generate a composite model based on a collected plurality of images. Embodiments of the present invention can be used to determine an image for display selected from the generated composite model based on a physical displacement of a device.

17 Claims, 10 Drawing Sheets

(56) References Cited

U.S. PATENT DOCUMENTS

2018/0111555 A1    4/2018   Men et al.
2018/0124363 A1    5/2018   Flessas
2018/0172206 A1    6/2018   Myerchin

OTHER PUBLICATIONS

Gaschler et al., "Intuitive Robot Tasks with Augmented Reality and Virtual Obstacles", 6 pages.

Seifert et al., "Hover Pad: Interacting with Autonomous and Self-Actuated Displays in Space", Novel Hardware I, UIST'14, Oct. 5-8, 2014, Honolulu, HI, USA, Copyright 2014 ACM 978-1-4503-3069-5/14/10, 9 pages, <http://dx.doi.org/10.1145/2642918.2647385>.

Yan et al., "Application of Augmented Reality and Robotic Technology in Broadcasting: A Survey", MDPI, Received: May 26, 2017; Accepted: Aug. 7, 2017; Published: Aug. 17, 2017, Robotics 2017, 6, 18; doi:10.3390/robotics6030018, 20 pages, <www.mdpi.com/journal/robotics>.

* cited by examiner

HAPTIC MOVABLE DISPLAY FOR SPATIAL CORRELATION

BACKGROUND

The present invention relates generally to the field of computer interfacing, and more particularly to generating displays of and modifying user interaction of 3D images.

Data analysis often involves looking at one or more feature values that are associated with particular 2D spatial locations. For instance, the spatial locations might be a map of the United States, and the feature values might be populations of each county over time. Another example is tomographic 3D information, such as magnetic resonance imaging (MRI) scans and data sets pertaining to geographic information systems (GIS). In this example, a series of 2D "slices" are stacked and viewed along a third orthogonal spatial axis. Another example are multi-spectral astronomical images where a celestial object is imaged in a progression of different wavelength bands such as radio, infrared, visible, ultraviolet, and X-ray.

Often it is important to correlate characteristics of a region at one feature value to its characteristics at some other value. For instance, in a series of galaxy images, it might be noticed that there are a few particularly bright spots in the X-ray spectral version. An astronomer might then want to know what these features correspond to in the visible spectral version. Similarly, a demographer might notice a high population in some county in the year 1950. The demographer might be interested to see how far back in time this urban area first appeared.

One current practice for examining spatial correspondences is to lay out a series of images side-by-side, each with some different value of the feature in question. For instance, one could display population-by-county maps for several different census years. Another current practice involves "wiping" between two images, that is, a movable dividing contour of some sort (typically a line) is shifted across an image. On one side of the boundary data from one feature value is displayed, while on the other side data from another feature value is shown. Thus, one could "scrub" back and forth over a location of interest and see, for instance, the astronomical image alternately in the infrared and ultraviolet bands. Another alternative is to display the data via some form of 3D or 2.5D (stereo) imagery. This is commonly done for medical imagery, such as for examining the exterior surface shape of vertebrae in the spine. Another approach is to have a fiducial "push pin" that spans across multiple images corresponding to a single location.

SUMMARY

Embodiments of the present invention disclose a method, a computer program product, and a system for determining and displaying an image selected from a plurality of images based on a physical displacement of a device. In one embodiment of the present invention, a method is provided comprising: generating a composite model comprising a collected plurality of images, wherein each image among the collected plurality of images has an image that spans across a first and a second and an assigned value associated with a third dimension; and, determining an image of the generated composite model that serves as the image displayed in a starting position of a device based on a physical displacement of the device with respect to a reference position of the device and the generated composite model.

DETAILED DESCRIPTION

Embodiments of the present invention recognize that difficulties can arise when examining spatial correspondences when comparing images side-by-side, comparing images using "wiping" methods, or by viewing 3D or 2.5D imagery. For instance, when comparing images side-by-side, it can be difficult for a user to remember a spatial location of interest in some map (e.g., a map of Cincinnati in 1900) and then quickly find this same location in some other map (e.g., a map of Cincinnati in 1920). When using the practice of "wiping" between images, a user can only correlate two values of the feature, and the particular values must be picked ahead of time. When using 3D or 2.D imagery methods, there can be problems displaying information that is intrinsically 3D due to occlusion. For example, when viewing anatomical medical scans of a patient, sometimes partial transparency is used to, for instance, visualize the mitral valve inside the heart itself. Unfortunately, a large number superimposed details (e.g., organs, bones, blood vessels, tissue surfaces, etc.) can be confusing to a user and impede analysis.

Embodiments of the present invention provides a technical improvement for viewing spatially registered and/or 3D/2.5D images. As described in greater detail later in the specification, embodiments of the abstractly stack a series of spatially registered images, one on top of another, along some feature axis. Physical movement of a device itself then selects which image is shown (or which adjacent pair of images is blended). In some embodiments, images can be designated varying levels of "interest" such that, when as a user scrolls through the image using the device, haptic feedback can be provided to the user to draw attention to particular values of the main feature.

In certain embodiments, the method does not require the user to remember spatial locations within an image. Instead, particular locations always appear in the same portion of the display. For instance, when examining census data of the city of Cincinnati through various years, the center of the city will always be at pixel location x=1124, y=853 on the display. Furthermore, some embodiments of the present invention also accommodate examining multiple values of the main feature without any need for pre-selecting. For instance, for astronomical data, all the wavelength bands are present, and the user can shift between non-adjacent bands by simply pushing the device further along a designated axis. Implementation of embodiments of the invention may take a variety of forms, and exemplary implementation details are discussed subsequently with reference to the figures.

Figure 1:
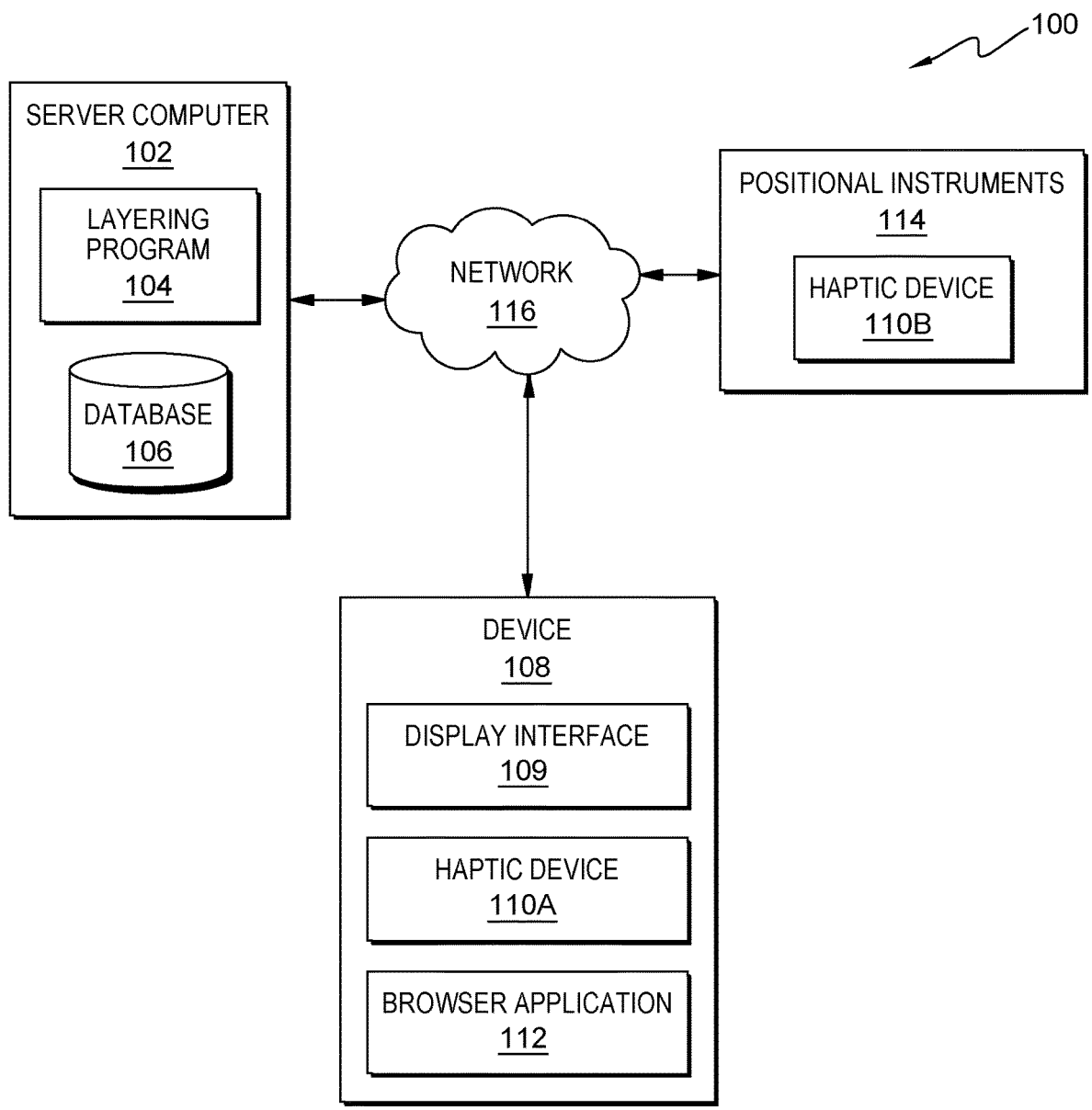
FIG. 1 is a functional block diagram illustrating a haptic display environment, in accordance with an embodiment of the present invention.

FIG. 1 is a functional block diagram illustrating a haptic display environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Haptic display environment 100 includes server computer 102, device 108, and positional instruments 114, all interconnected over network 116. Server computer 102 and device 108 can be a standalone computing device, a management server, a webserver, a mobile computing device, or any other electronic device or computing system capable of receiving, sending, and processing data. In other embodiments, server computer 102 and device 108 can represent a server computing system utilizing multiple computers as a server system, such as in a cloud computing environment. In another embodiment, server computer 102 and device 108 can be a laptop computer, a tablet computer, a netbook computer, a personal computer (PC), a desktop computer, a personal digital assistant (PDA), a smart phone, or any programmable electronic device capable of communicating with various components and other computing devices (not shown) within haptic display environment 100. In another embodiment, server computer 102 and device 108 each represent a computing system utilizing clustered computers and components (e.g., database server computers, application server computers, etc.) that act as a single pool of seamless resources when accessed within haptic display environment 100. In some embodiments, server computer 102, device 108, and positional instruments 114 are a single device. Server computer 102 and device 108 may include internal and external hardware components capable of executing machine-readable program instructions, as depicted and described in further detail with respect to FIG. 5.

Server computer 102 includes layering program 104 and database 106. In general, layering program 104 determines an image for display among a plurality of images based on a physical displacement of a device displaced by a user with respect to a reference position and communicates determined information to one or more devices such as a device capable of generating haptic feedback (e.g., device 108 and positional instruments 114). Additionally, layering program 104 is a program capable of generating haptic feedback based on interest points of the determined image for display among the plurality of images. In one embodiment, layering program 104 determines an image for display for a starting position of a device based on a physical displacement of the device with respect to a reference position of the device and the plurality of images. Layering program 104 is depicted and described in further detail with respect to FIG. 2.

As used herein, haptic feedback is any force feedback produced for a user by either haptic device 110A or 110B, which can include, but is not limited to, increased stiffness of positional instruments 114 (e.g., actuators or motor servomechanism serving as haptic device 110B associated with positional instruments 114 receive signals from layering program 104 to dampen, with a determined force, a displacement motion of device 108 displaced by a user) and/or vibrations of variable intensity and frequency. Vibrational haptic feedback can be produced by devices such as an ERM (eccentric rotating mass), an LRA (linear resonant actuator), a piezo-electric transducer, or even a Polyvinylidene difluoride (PVDF) film. Layering program 104 can generate signals to haptic device 110A and/or 110B such that the generated signals instruct haptic device 110A and/or 110B to vibrate at a determined frequency, to vibrate at varying frequencies, to vibrate at a determined magnitude, and/or to vibrate with a repetition rate of discrete pulses. In some embodiments, haptic device 110A and haptic device 110B are a signal haptic device.

Database 106 is a repository for data accessible by layering program 104. Database 106 can be implemented with any type of storage device capable of storing data and configuration files that can be accessed and utilized by server computer 102, such as a database server, a hard disk drive, or a flash memory. Database 106 stores a plurality of images and corresponding metadata associated with each image among the plurality of images.

Metadata corresponding to each image among the plurality of images contains information that indicates a degree of haptic feedback associated with the image and coordinates that identify interest points on the image. The degree of haptic feedback provides instructions for layering program 104 to generate a haptic signal to haptic device 110A and/or haptic device 110B to dampen a displacement motion with a determined force and/or vibrate at a determined frequency, magnitude, or pattern of vibration when an associated image among a plurality of images is displayed on display interface 109.

As used herein, interest points are location(s) on an image that identify points that are of interest to a user (e.g., location of a detected anomaly on the image or a flagged landmark on the image). Interest points for an image among a plurality of images can be determined and stored in database 106 by a user or a third-party image analysis program that can detect anomalies, extremes, or other salient regions in an image and can designate the detected anomalies, extremes, or other salient regions as an interest point. In one embodiment, a user can select a location on an image among a plurality of images as an interest point. Furthermore, a user can assign the interest point a specific haptic feedback response to be associated with the image, such that the specific haptic feedback response provides instructions for layering program 104 to generate a haptic signal to haptic device 110A and/or haptic device 110B to dampen a displacement motion with a determined force and/or vibrate at a determined frequency, magnitude, or pattern of vibration when the image among the plurality of images is displayed on display interface 109.

Furthermore, each image among the plurality of images has corresponding metadata that describes a positional relationship between each image among the plurality of images. For example, each image among the plurality of images can have preassigned coordinate points (at least two coordinate points) assigned at the moment each image among the plurality of images are captured such that the images among the plurality of images can be aligned (i.e., "stacked") to a common two-dimensional coordinate or coordinate system. For example, each image among the plurality of images share a common landmark that have a corresponding coordinate. The images can then be stacked along a third dimension such that, when viewed along the third dimension, the plurality of images can be aligned such that the common landmark overlaps between each image among the plurality of images. Even furthermore, the preassigned coordinate points have information describing how an image relates to each image among the plurality along a third dimension. In continuing from the previous example, each image among the plurality of images contains a common landmark, and each image is assigned a value that corresponds to a particular time of the image, wherein the different values of time correspond to values that exist on a third dimension (i.e., time is the third dimension for each of the images among the plurality of images). For example, each image among the plurality of images contains a common landmark (e.g., the Statue of Liberty on a satellite photo), and each image among the plurality of images corresponds to the years 1991, 1992, 1993, etc. respectively.

In one embodiment, layering program 104 to provide haptic feedback based on the location of an interest point on an image while moving an image translationally on display interface 109. For example, a user viewing a satellite image containing an interest point associated with a landmark on the satellite image. While zoomed into the image, the user moves the satellite image translationally (corresponding to translational motions of device 108) such that the interest point moves closer to the center of display interface 109. As the user moves the interest point closer to the center of display interface 109, layering program 104 transmits a haptic signal to haptic device 110A and/or haptic device 110B that causes haptic device 110A and/or haptic device 110B to produce an increasingly dampened force resistive to the translational motion of device 108. This increasingly dampened force indicates to a user that the user is translationally moving the image such that the interest point is approaching the center of display interface 109. In a further embodiment, if the user translationally moves the image such that the interest point is moving away from the center of display interface 109, then no dampening force is produced. In alternate embodiment, as the user moves the interest point away from the center of display interface 109, layering program 104 transmits a haptic signal to haptic device 110A and/or haptic device 110B that causes haptic device 110A and/or haptic device 110B to produce an increasingly dampened force resistive to the translational motion of device 108. This increasingly dampened force indicates to a user that the user is translationally moving the image such that the interest point is moving away from the center of display interface 109.

In one embodiment, the haptic signal responsible for the damping force is a signal that describes a damping force that increases as an interest point approaches closer to the center of display interface 109. For example, the haptic signal can be such that the dampening force produced is proportional to a gaussian function (i.e., bell curve) based on the distance between the interest point and the center of display interface 109. In another embodiment, when the user moves the interest point within a predetermined radius centered on display interface 109, layering program 104 transmits a haptic signal to haptic device 110A and/or haptic device 110B that produces a vibrational pulse for the user, thus indicating to the user that the user has translationally moved the interest point approximately to the center of display interface 109.

Device 108 includes haptic device 110A, browser application 112, and display interface 109. Browser application 112 is a client program of layering program 104 that a user interacts with layering program 104 on device 108. In general, browser application 112 can be implemented using a browser and web portal or any program that transmits queries to, and receives results from, server computer 102 which hosts layering program 104.

Haptic device 110A is a device that, when a haptic signal is received from layering program 104, can generate haptic feedback for a user. Display interface 109 is a computer output surface and projecting mechanism that shows text and graphic images to the user using a cathode ray tube (CRT), liquid crystal display (LCD), light-emitting diode (LED), gas plasma, or other image projection technologies. As used herein, display interface 109 displays for a user a graphical user interface (GUI) containing, but not limited to, a set of interactive icons and/or items for selection that can be selected using a cursor. Display interface 109 can be implemented using a browser, web portal, or any program that transmits queries to, and receives results from, server computer 102.

In one embodiment, layering program 104 can transmit video feed to display interface 109, wherein display interface 109 supports 3D imaging. For example, layering program 104 can transmit video feed that corresponding to a 3D image or an image capable of being displayed on virtual reality (VR) or augmented reality (AR) devices. In this is embodiment, display interface 109 can be smart glasses, a wearable display glasses that display two perspective images (i.e., an image for each eye of the user) of a same object (i.e., image parallax), or a device that emits two superimposed images where each image is emanated with a corresponding electromagnetic light polarization such that, when viewed through corresponding polarized lenses by a user (e.g., 3D glasses), a 3D image is perceived by the user.

Positional instruments 114 is a device or devices that measures positional displacements of device 108 from a reference position. As used herein, a reference position is a position that displacement measurements are measured from (e.g., a reference position can be a storage position, a first position, or a second position, wherein the first and second position respectively correspond to an end point of a range of displacement for device 108). Layering program 104 communicates with positional instruments 114 to acquire a signal that indicates a positional displacement of device 108 used for determining an image among a plurality of images for display and/or haptic feedback. In one embodiment, positional instruments 114 can include actuators and servomechanisms associated with a cantilever arm (e.g., a robotic arm) that supports device 108. In one embodiment, positional instruments 114 can include haptic device 110B that, when a haptic signal is received from layering program 104, can generate haptic feedback for a user (e.g., a force feedback servomechanism that can measure displacements and provide haptic feedback).

In in alternate embodiment, positional instruments 114 can be a digital camera such that layering program 104 can acquire images taken by the digital camera, and layering program 104 can subsequently analyze the acquired images to determine a displacement position of device 108 from a reference position. For example, in one exemplary embodiment, server computer 102, device 108, and positional instruments 114 can be combined into a single device, such as a computer tablet, wherein the computer tablet contains a user facing camera that layering program 104 can access to analyze images of a user captured by the camera to determine a distance between the user and the computer tablet. Furthermore, layering program 104 can further determine a displacement position of device 108 from a reference position based on the determined distance between the user and the computer tablet. In an even further embodiment, device 108 can have a secondary digital camera that layering program 104 can use, in combination or alone with the user facing camera, to determine rotational or translational displacements of device 108 based on images of a room environment. In an even further embodiment, positional instruments 114 can be optical (e.g., infrared) or ultrasonic rangefinders. In alternate embodiment, positional instruments 114 can be a 3D camera that can measure parallax used to determine distance from the camera.

Network 116 can be, for example, a telecommunications network, a local area network (LAN), a wide area network (WAN), such as the Internet, or a combination of the three, and can include wired, wireless, or fiber optic connections. Network 116 can include one or more wired and/or wireless networks that are capable of receiving and transmitting data, voice, and/or video signals, including multimedia signals that include voice, data, and video information. In general, network 116 can be any combination of connections and protocols that will support communications among server computer 102, device 108, and positional instruments 114, and other computing devices (not shown) within haptic display environment 100.

For illustrative purposes, the following discussion is made with respect to layering program 104 hosted on server computer 102, where a user interacts with layering program 104 via browser application 112 on device 108. However, it should be understood that server computer 102, device 108, and positional instruments 114 can be on a single device, a combination of devices, and/or on one or more other components of haptic display environment 100.

Figure 2:
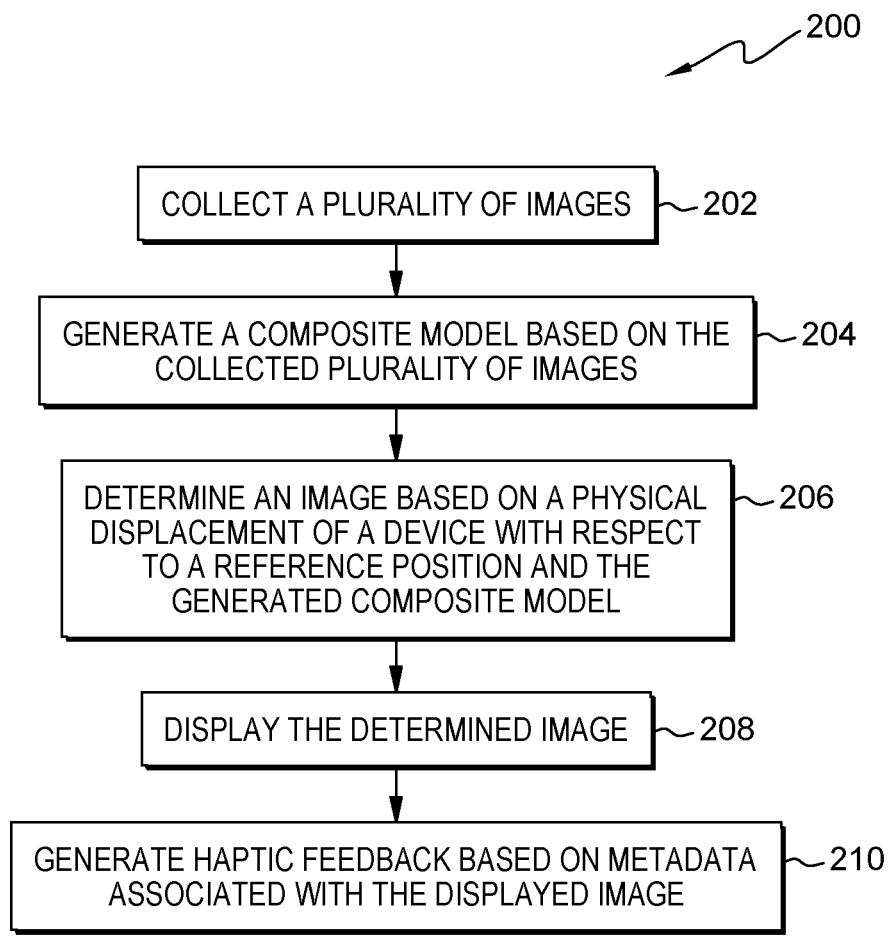
FIG. 2 is a flowchart depicting operational steps of a layering program for a haptic display that provides haptic feedback for a user while navigating image slices, in accordance with an embodiment of the present invention.

FIG. 2 is a flowchart 200 depicting operational steps of a layering program for a haptic display that provides haptic feedback for a user while navigating image slices, in accordance with an embodiment of the present invention.

In step 202, layering program 104 collects a plurality of images. In this embodiment, layering program 104 collects a plurality of images and associated metadata corresponding to the plurality of images by accessing database 106 and acquiring the plurality of images stored on database 106 associated with a subject (i.e., a person, an object, a galaxy, a city, etc.). As used herein, the plurality of images can be tomographic images (i.e., 2D sections or slices) of a 3D object or person, such as medical scans of a person (e.g., magnetic resonance imaging (MRI) scans of a brain of a person) or cross-sections of an engineering computer-aided design (CAD) drawing. Additionally, the plurality of images can be 2D images of an object that have a third dimensional aspect aside from a spatial dimension, such as time, electromagnetic wave spectra, or any other dimensional element that extends across multiple 2D images of the same object. For example, the plurality of images can be satellite photos of a specific city over the course of time, or astronomical images of a galaxy such that the images correspond to various electromagnetic spectra (i.e., infrared, visible, ultraviolet, x-ray, etc.). As used herein, metadata corresponding to the plurality of images contains data that indicate interest points for each image among the plurality of images, wherein an interest point is a point of location on an image among the plurality of image that is designated as being "interesting" for a user and has a corresponding degree of haptic feedback stored as part of the metadata associated with the image among the plurality of images when read by layering program 104 (i.e., the metadata provides instructions for layering program 104 to generate a haptic signal to haptic device 110A and/or haptic device 110B to dampen a displacement motion with a determined force and/or vibrate at a determined frequency, magnitude, or pattern of vibration when an associated image among a plurality of images is displayed on display interface 109).

In one embodiment, metadata describing interest points corresponding to a plurality of images can be determined by a user or a computer program. For example, an urban development historian while viewing a plurality of satellite photos of a city ranging across a period of Dec. 31, 1980 to Dec. 31, 1990 designates an interest point corresponding to a location on a photo dated Jul. 2, 1986 of the city among the plurality of satellite photos of the city across the period. The historian uses browser application 112 on device 108 to select the satellite image of the city dated Jul. 2, 1986 stored on database 106, selects the location on the satellite image to be an interest point, selects an interactive icon from a dropdown menu on browser application 112 that designates the location on the satellite image of the city as an interest point, selects a degree of haptic feedback associated with the interest point to include of a short buzz pulse and one Newton resistive force, and saves the interest point and associated haptic feedback selection as metadata corresponding to the satellite image of the city dated Jul. 2, 1986. Layering program 104 subsequently saves the metadata associated with the image to database 106. At a later time, the historian, wishing to browse through the plurality of satellite images associated with the city from Dec. 31, 1980 to Dec. 31, 1990, selects the plurality of satellite images using browser application 112, subsequently instructing layering program 104 to collect the plurality of satellite images from database 106 as well as the metadata associated with the plurality of satellite images, which includes the interest point (i.e., the image corresponding to Jul. 2, 1986) and associated haptic feedback selection for the interest point.

In step 204, layering program 104 generates a composite model based on the collected plurality of images. By generating a composite model based on the collected plurality of images, this allows for layering program 104 to quickly scroll through the collected plurality of images along a third dimension, while simultaneously maintaining two-dimensional alignment of each image with respect to the collected plurality of images. In this embodiment, layering program 104 generates a composite model based on the collected plurality of images by digitally aligning the collected plurality of images along a shared 2D coordinate system based on an assigned plurality of shared 2D coordinates assigned to each image among the plurality of images. In one embodiment, each image among the plurality of images is preassigned at least two coordinate points (typically assigned at the moment the image was captured) that are shared two-dimensionally among the collected plurality of images. For example, for a coordinate system (e.g., x,y,z), image A has coordinate points A1=(0,0,0), A2=(1,0,0), and A3=(0,1,0); and image B has coordinate points B1=(0,0,1), B2=(1,0,1), and B3=(0,1,1). Layering program 104 can align image A and image B by pairing the coordinate points along the x- and y-dimensions. By continuing the example, this would mean coordinate points A1 is paired with B1, A2 with B2, and A3 with B3. By aligning at least two coordinate points, this ensures layering program 104 aligns the plurality of images such that they are scaled and rotated to proper orientation.

Furthermore, layering program 104 generates a composite model based on the collected plurality of images by sorting the plurality of images along a third dimensional number line in numerical order based on a third dimensional value assigned to each image among the plurality of images. In continuing with the previous example, a third image, image C, is add to the plurality of images, wherein image C has coordinate points C1=(0,0,2), C2=(1,0,2), and C3=(0,1,2). Layering program 104 determines that, with increasing z-dimensional value, image A is first (i.e., z=0), image B is second (i.e., z=1), and image C is third (i.e., z=2) according to a z-dimension number line. In a further embodiment, a user can select on browser application 112 whether an increasing value along a z-dimension number line corresponds to either increasing in depth or in height.

In an alternate embodiment, a composite model corresponding to a plurality of images can be pre-aligned and stored on database 106 by a third party, allowing layering program 104 to readily scroll through the collected plurality of images along a third dimension, while simultaneously maintaining two-dimensional alignment of each image with respect to the collected plurality of images. For example, layering program 104 can retrieve from database 106 and read data sets and/or images that are commonly utilized by a geographic information system (GIS).

In step 206, layering program 104 determines an image based on a physical displacement of device 108 with respect to a reference position and the generated composite model. In this embodiment, layering program 104 determines an image based on a physical displacement of device 108 with respect to a reference position and the generated composite model by determining a range of displacement of device 108, mapping the generated composite model to the determined range of displacement, identifying a location of the device within the range of displacement, and identifying an image among the plurality of images based on the identified location of the device within the range of displacement as described in greater detail with regard to FIG. 3, flowchart 300.

In step 208, layering program 104 displays the determined image among the generated composite model. In this embodiment, displays the determined image among the generated composite model by transmitting a video signal to display interface 109, wherein the video signal describes the determined image such that, when display interface 109 receives the video signal, display interface 109 displays the determined image. For example, layering program 104 determines there are three images that define a plurality of images: image A, image B, and image C. Furthermore, layering program 104 determines that device 108 is at a position of physical displacement of device 108 that corresponds to image B. Layering program 104 transmits a video signal to display interface 109 that corresponds to image B, and display interface 109 subsequently displays image B.

In another embodiment, layering program 104 can generate and display a new image by blending adjacent images based on the position of physical displacement. For example, layering program 104 determines a position of physical displacement of device 108 that corresponds to a non-existent image that hypothetically would exist between image A and image B (e.g., image A is located at z=0 and image B is located at z=1, and no other image exists between image A and image B; however, device 108 is located at a position that corresponds to z=0.5). Layering program 104 can blend image A and image B to generate and display a new image based on the measured distances between image A and image B with respect to the corresponded position of device 108 (e.g., with device 108 is located at z=0.5, which is located halfway between image A and image B, layering program 104 generates and displays a new image that is a 50-50 blend of image A and image B).

In another embodiment, layering program 104 transmits a video signal to display interface 109, wherein the video signal describes a 3D image, and display interface 109 is a device that can display 3D imaging (e.g., VR/AR display device) for a user such that, when viewed by a user, the user can perceive a 3D image. In an even further embodiment, layering program 104 can display the generated composite model. For example, layering program 104 generates a composite 3D model of a human brain based on a collected plurality of images, wherein the collected plurality of images describes 2D image slices of a human brain (e.g., MRI imaging). In this embodiment, a user can select an image slice of the human brain to view two dimensionally for display, layering program 104 can display the selected image for a primary interactive window. Furthermore, layering program 104 can display the generated composite 3D model of the human brain in a secondary window, wherein layering program 104 highlights the location of the image slice with respect to the generated composite 3D model of the human brain. In other words, layering program 104 displays a 3D model of the brain while also displaying a geometric plane that intersects with the 3D model of the brain that indicates the cross-section being viewed by the user.

In step 210, layering program 104 generates haptic feedback based on metadata associated with the displayed image. In this embodiment, layering program 104 generates haptic feedback based on metadata associated with the displayed image by acquiring metadata from database 106 that corresponds to the displayed image (wherein the metadata contains information that indicates a degree of haptic feedback associated with the displayed image) and generating a respective haptic signal to haptic device 110A and haptic device 110B based on the acquired metadata. In continuing the example of step 202 wherein a degree of haptic feedback is stored to database 106 corresponding to a satellite image of a city dated Jul. 2, 1986, when a user moves device 108 to a position of displacement that corresponds to the satellite image of the city dated Jul. 2, 1986, layering program 104 displays the image on display interface 109, acquires metadata associated with the image such that metadata contains a degree of haptic feedback comprising of a short buzz pulse and one Newton resistive force, and generates a haptic signal to haptic device 110A and haptic device 110B such that, when haptic device 110A and haptic device 110B receive the haptic signal, haptic device 110A and haptic device 110B produce the short buzz pulse and one Newton resistive force for the user.

In another embodiment, layering program 104 generates haptic feedback based on the location of an interest point on an image while moving an image translationally on display interface 109. For example, a user viewing a satellite image containing an interest point associated with a landmark on the satellite image. While zoomed into the image, the user moves the satellite image translationally (corresponding to translational motions of device 108) such that the interest point moves closer to the center of display interface 109. As the user moves the interest point closer to the center of display interface 109, layering program 104 transmits a haptic signal to haptic device 110A and/or haptic device 110B that causes haptic device 110A and/or haptic device 110B to produce an increasingly dampened force resistive to the translational motion of device 108. This increasingly dampened force indicates to a user that the user is translationally moving the image such that the interest point is approaching the center of display interface 109. In a further embodiment, if the user translationally moves the image such that the interest point is moving away from the center of display interface 109, then no dampening force is produced.

In another embodiment, layering program 104 generates haptic feedback that corresponds to a damping force that increases as an interest point approaches closer to the center of display interface 109. For example, the haptic signal can be such that the dampening force produced is proportional to a gaussian function (i.e., bell curve) based on the distance between the interest point and the center of display interface 109. In another embodiment, when the user moves the interest point within a predetermined radius centered on display interface 109, layering program 104 transmits a haptic signal to haptic device 110A and/or haptic device 110B that produces a vibrational pulse for the user, thus indicating to the user that the user has translationally moved the interest point approximately to the center of display interface 109.

Figure 3:
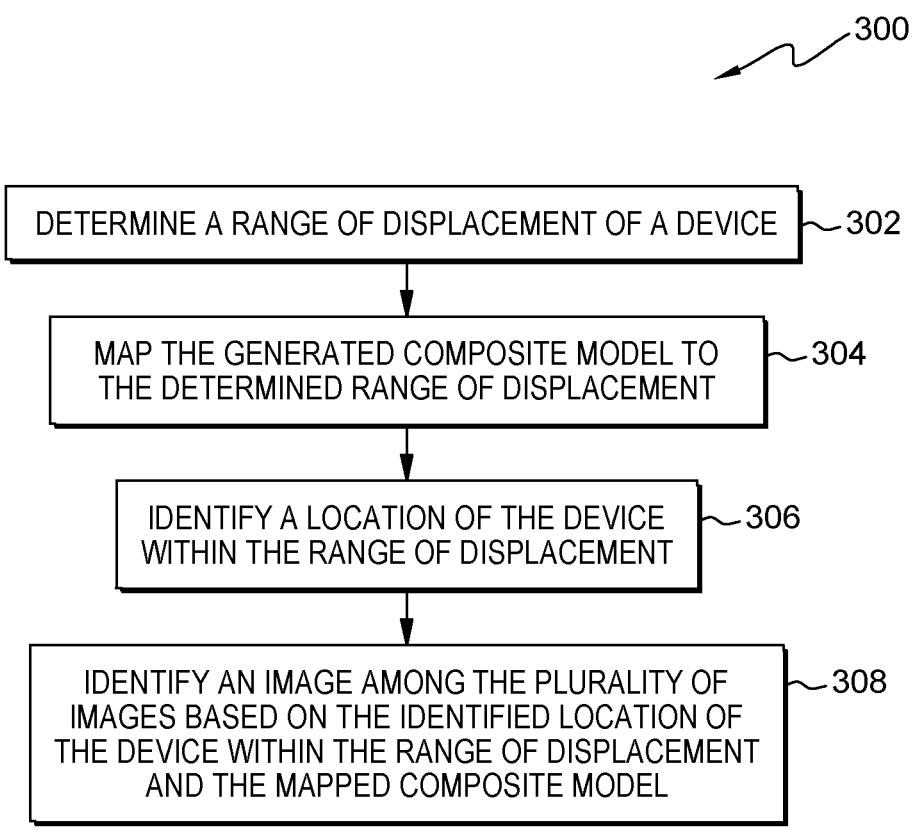
FIG. 3 is a flowchart depicting operational steps of determining an image based on a physical displacement of a device with respect to a reference position and the generated composite model, in accordance with an embodiment of the present invention.

FIG. 3 is a flowchart 300 depicting operational steps of determining an image based on a physical displacement of a device with respect to a reference position and the generated composite model, in accordance with an embodiment of the present invention.

In step 302, layering program 104 determines a range of displacement of a device. In this embodiment, layering program 104 determines a range of displacement of a device by determining a reference position based on measurement signals of positional instruments 114 and basing a range of displacement based on the measured distances from the reference position using measurement signals from positional instruments 114. As used herein, a range of displacement is a spanning distance between a first position and a second position determined by layering program 104. In this embodiment, layering program 104 determines a reference position and a range of displacement based on measurement signals from positional instruments 114 through a calibration process, which is performed during an initial calibration or recalibration of device 108 with layering program 104 and positional instruments 114. For example, during initial calibration or recalibration, layering program 104 detects a reference position of device 108 based on measurement signals produced by positional instruments 114 and designates the reference position as an origin value along a z-axis (e.g., z=0 cm), wherein the z-axis is in a dimension that is designated as being orthogonal to each 2D image (having designated dimensions x-y) among the plurality of images. Layering program 104 then requests that a user move device 108 to a first position, wherein the first position is a position along the z-axis of a direction of motion of device 108. Upon receiving confirmation from a user that device 108 is at a first position, layering program 104 determines a first distance from the reference position (e.g., z=30 cm) based on measurement signals produced by positional instruments 114. Layering program 104 then requests that a user move device 108 to a second position, wherein the second position is along the z-axis of a direction of motion of device 108, and wherein the second position is located across from the first position respective to the reference position. In an alternate embodiment, the second position can be the reference position. Upon receiving confirmation from the user that device 108 is at a second position, layering program 104 determines a second distance from the reference position (e.g., z=−20 cm) based on measurement signals produced by positional instruments 114. Upon determining both the first position and the second position of device 108, layering program 104 determines a range of displacement based on the measured distances of the first position and the second position based on the reference position (e.g., layering program 104 determines the range of displacement spans across z=−20 cm and z=30 cm), and stores the determined range of displacement to database 106 as a configuration file.

In step 304, layering program 104 maps the generated composite model to the determined range of displacement. In this embodiment, layering program 104 maps the generated composite model to the determined range of displacement by mapping one-to-one the determined range of displacement of device 108 to the third dimensional values corresponding to each 2D image of the generated composite model. For example, layering program 104 determines that a range of displacement of device ranges from −20 cm to 30 cm, wherein the reference position corresponds to 0 cm. Furthermore, layering program 104 determines that a generated composite model stored on database 106 contains a plurality of 2D images that each have a corresponding third dimensional value representing time, and that the range of the corresponding third dimensional values ranges from years 1990 to 2000. Layering program 104 maps one-to-one the plurality of 2D images of the generated composite model to the determined range of displacement such that the 2D image corresponding to year 1990 is mapped to position −20 cm of device 108, and the 2D image corresponding to year 2000 is mapped to position 30 cm of device 108.

In step 306, layering program 104 identifies a location of the device within the range of displacement. In this embodiment, as a user moves device 108 to various positions along the determined range of displacement of device 108, layering program 104 identifies a location of device 108 within the range of displacement by collecting a signal from positional instruments 114 that describes a current position of device 108 among various positions of device 108 displaced by the user. In continuing from the example of step 304, a user moves device 108, having a determined range of −20 cm to 30 cm, from −20 cm to 30 cm. At one instance of time, device 108 is located at 5 cm during the motion of device moving from −20 cm to 30 cm. Layering program 104 identifies the location of device 108 at the one instance of time based on measured signals collected from positional instruments 114 that such that the signals collected correspond to the location of device 108 at the one instance of time. In one embodiment, layering program 104 identifies the location of device 108 by comparing collected signals from positional instruments 114 to the determined range of displacement. For example, layering program 104 determines that a first set of signals collected from positional instruments 114 correspond to a first position of 30 cm, and a second set of signals correspond to a second position of −20 cm. Layering program 104 then collects a third set of signals from positional instruments 114 and determines that the third set of signals, in comparison of the first set of signals and the second set of signals, corresponds to a position of 5 cm. In another embodiment, layering program 104 can determine a location of device 108 by integrating velocities with respect to time based on sensed velocities measured by layering program 104 via positional instruments 114 and a determined set of initial conditions (typically the starting position of the motion). Similarly, layering program 104 can determine a location of device 108 by integrating accelerations with respect to time based on sensed accelerations measured by layering program 104 via positional instruments 114 to obtain a velocity function and a set of initial conditions (typically the starting velocity of the motion), and then further integrating the velocity function to determine a location based on initial conditions (typically the starting position of the motion).

In step 308, layering program 104 identifies an image among the plurality of images based on the identified location of the device within the range of displacement and the mapped composite model. In this embodiment, layering program 104 identifies an image among the plurality of images based on the identified location of device 108 within the range of displacement and the mapped composite model by comparing the identified location of device 108 to the mapped composite model with respect to the determined range of displacement of device 108. In continuing with the previous example of step 306, layering program 104 determines that the location of device 108 is located at 15 cm at one instance of time. Furthermore, layering program 104 determined that the range of displacement of device 108 ranges from 0 cm to 30 cm, and that the range of displacement is mapped to a plurality of 2D images of a composite model that ranges in years 1990 to 2000 respectively. Layering program 104 identifies that the location of device 108 at 15 cm corresponds to a 2D image corresponding to year 1995 among the plurality of images of the composite model.

Figure 4:
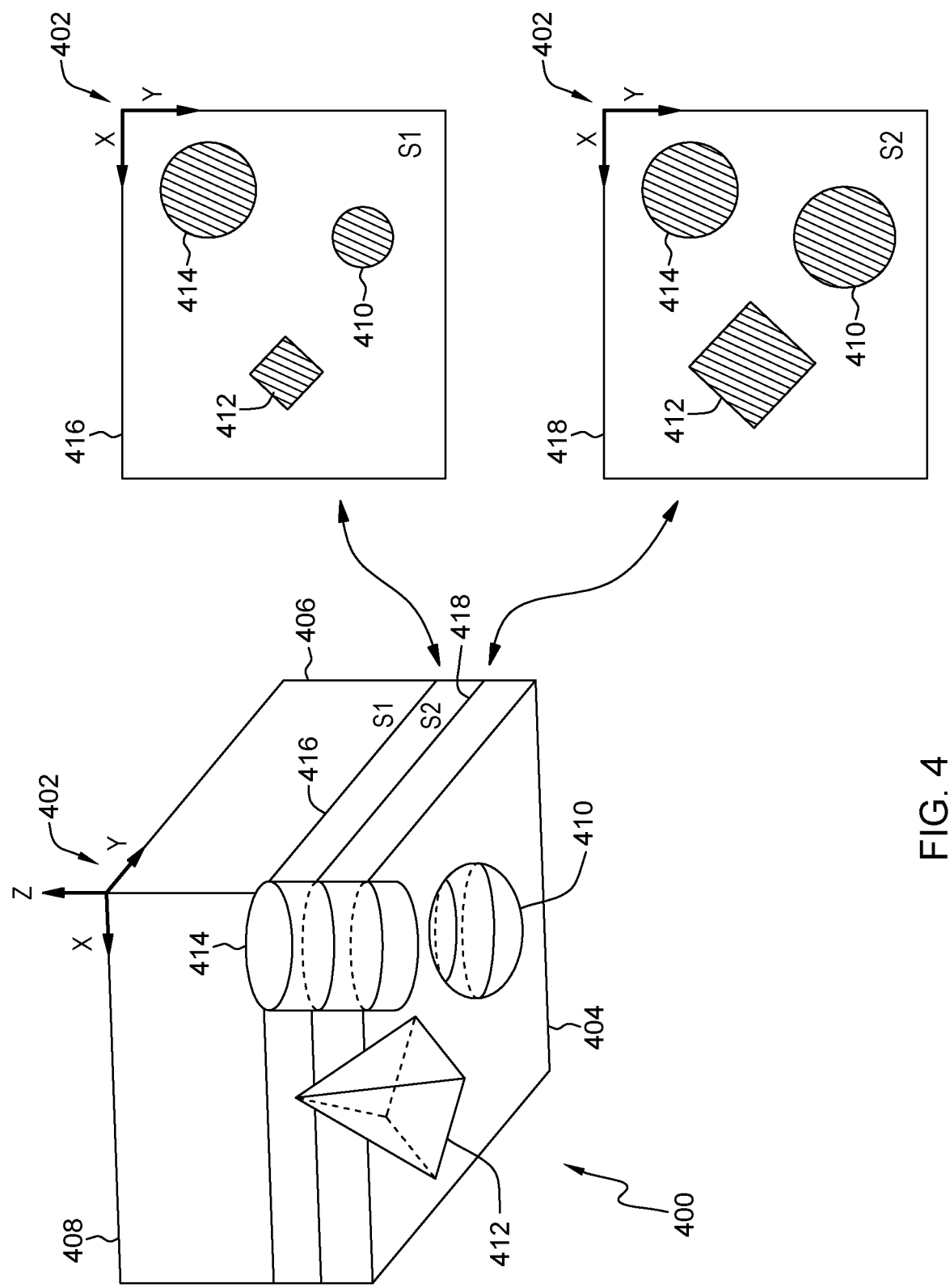
FIG. 4 is an example of various image slices of an object in a 3D environment, in accordance with an embodiment of the present invention.

FIG. 4 is an example of various images slices of an object in a 3D environment 400, in accordance with an embodiment of the present invention.

In general, 3D environment 400 includes a set of 3D objects in an abstract space generated by layering program 104, wherein the set of 3D objects make up a composite model based on a plurality of 2D images. For example, layering program 104 collects a plurality of cross-section images of a set of objects, generates a composite model based on the collected plurality of cross-section images of the set of objects, and orients the generated composite model into a 3D environment 400 based on a coordinate system. In this example, 3D environment 400 is assigned a 3D (e.g., x,y,z) coordinate system 402 with x-y plane 404, z-y plane 406, and x-z plane 408. Furthermore, the composite model of sphere 410, square based pyramid 412, and cylinder 414 are generated such that the composite model is resting on x-y plane 404. In another example, cross-sections of the composite model are taken with respect to a geometric plane in the coordinate system. In this example, cross-section 416 and cross-section 418 are taken along x-y plane 404 and correspond to a positions S1 and S2 respectively along a z-axis of coordinate system 402. Furthermore, cross-section 416 and cross-section are two 2D images among the plurality of 2D images that are used to generate the composite model.

Figure 5A:
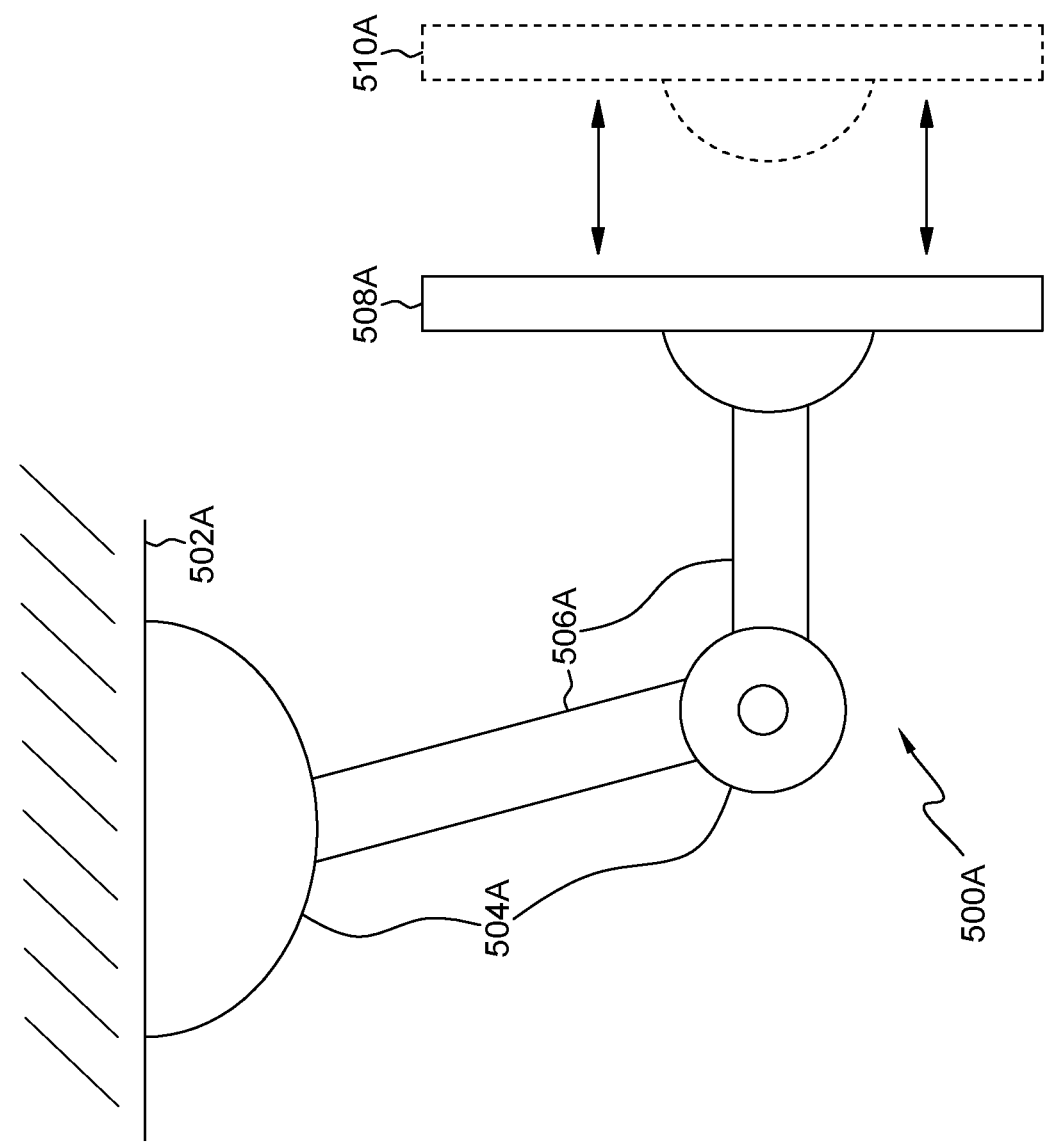
FIG. 5A is an example operation of a haptic display along a z-axis while attached to a force feedback cantilever, in accordance with an embodiment of the present invention.

FIG. 5A is an example operation 500A of a haptic display along a z-axis while attached to a force feedback cantilever, in accordance with an embodiment of the present invention. It should be appreciated that FIG. 5A provides only an illustration of one implementation and does not imply any limitations with regard to the environments in which different embodiments can be implemented. Many modifications to the depicted environment can be made.

In general, example operation 500A includes an interactive display, a structural foundation, a set of servomechanisms that measure displacements of the interactive display and include haptic devices, and a set of cantilever arms that support the interactive display. For example, a display is attached to a set of cantilever arms with corresponding servomechanisms that can rotate and measure joint angles that can be used to determine a physical displacement of the interactive display. In this example, interactive display 508A located at a first position is connected to cantilever arm 506A. Cantilever arms 506A are joined by servomechanism 504A, and joint angles between cantilever arms 506A are rotatable and measurable by servomechanism 504A. Cantilever arms 506A are suspended from foundation 502A and are joined by servomechanism 504A, and joint angles between cantilever arms 506A and foundation 502A are rotatable and measurable by servomechanism 504A. In another example, interactive display 508A can be displaced from a first position to a second position. In this example, interactive display 508A can be displaced to second position 510A. In another example, layering program 104 displays a determined image from a plurality of images based on a position of the interactive display. In this example, layering program displays cross-section 418 on interactive display 508A based on the first position of interactive display 508A. A user pulls interactive display 508A to second position 510, and layering program 104 correspondingly displays cross-section 416 on interactive display 508A. In another example, when the interactive display is moved from a first position to a second position, and layering program 104 detects an interest point associated the second position, layering program 104 transmits a haptic signal to a haptic device based on the interest point associated with the second position. In this example, a user pulls interactive display 508A to second position 510A, and layering program 104 correspondingly displays cross-section 416 on interactive display 508A. Furthermore, as interactive display 508A approaches second position 510A, layering program 104 determines that cross-section 416 contains an interest point and subsequently transmits a haptic signal to servomechanisms 504A to increase a resisting force to the motion of interactive display 508A, thus indicating to a user that interactive display 508A is approaching a position corresponding to an interest point. Even furthermore, once interactive display 508A arrives at second position 510A, layering program 104 transmits a haptic signal to servomechanisms 504A to vibrate, thus indicating to a user that interactive display 508A has arrived at a position corresponding to an interest point.

Figure 5B:
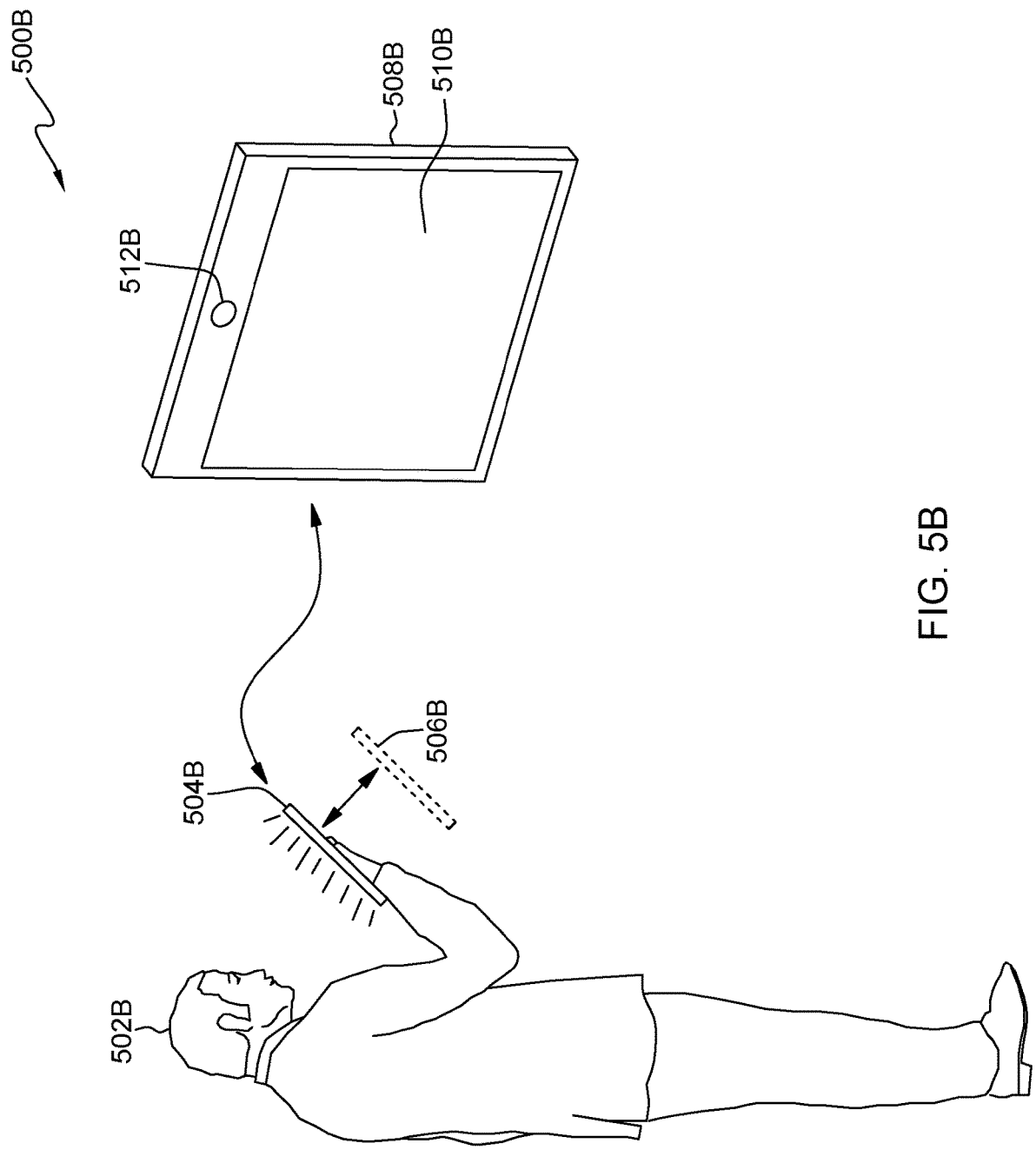
FIG. 5B is an example operation of a hand-held haptic display along a z-axis, in accordance with an embodiment of the present invention.

FIG. 5B is an example operation 500B of a hand-held haptic display along a z-axis, in accordance with an embodiment of the present invention. It should be appreciated that FIG. 5B provides only an illustration of one implementation and does not imply any limitations with regard to the environments in which different embodiments can be implemented. Many modifications to the depicted environment can be made.

In general, example operation 500B includes a user and a device containing an interactive display and one or more positional instruments. For example, a user holds a device containing an interactive display and one or more positional instruments at a first position. In this example user 502B holds computer tablet 508B at position 504B. In another example, the device has one or more positional instruments that can be used by layering program 104 to determine a distance between the user and the device and/or a relative displacement of device. In this example, computer tablet 508B has camera 512B that captures images of user 502B such that layering program 104 can compare size proportions of the user in the captured images to determine a distance between user 502B and computer tablet 508B and/or relative displacement of computer tablet 508B. In another example, the device can be displaced from a first position to a second position. In this example, computer tablet 508B is moved from position 504B to position 506B. In another example, layering program 104 displays a determined image from a plurality of images based on a position of the device. In this example, layering program displays cross-section 416 on interactive display 510B based on position 504B of computer tablet 508B. User 502B lowers computer tablet 508B to position 506B, and layering program 104 correspondingly displays cross-section 418 on interactive display 510B. In another example, when the interactive display is moved from a first position to a second position, and layering program 104 detects an interest point associated the second position, layering program 104 transmits a haptic signal to a haptic device based on the interest point associated with the second position. In this example, layering program 104 determines that an interest point is associated with position 506B. When user 502B moves computer tablet 508B to position 506B, layering program 104 transmits a haptic signal to a haptic device imbedded in computer tablet 508B that instructs the haptic device to vibrate, thus indicating to user 502B that computer tablet 508B has arrived at a position corresponding to an interest point.

Figure 6:
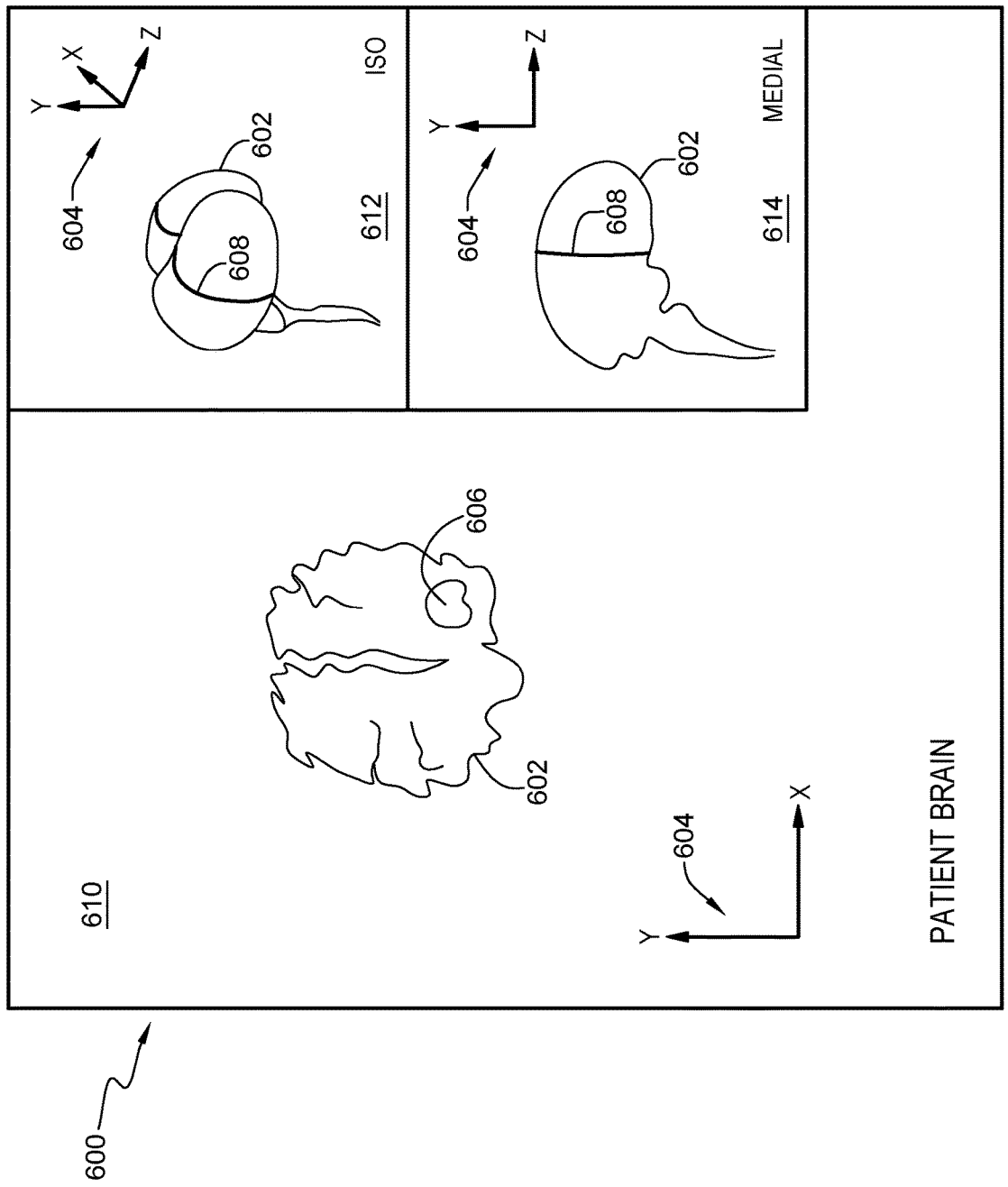
FIG. 6 is an example screenshot of a brain cross-section displayed by a layering program, in accordance with an embodiment of the present invention.

FIG. 6 is an example screenshot 600 of a cross-section of a brain cross-section displayed by a layering program, in accordance with an embodiment of the present invention.

In general, example screenshot 600 includes interactive graphical windows that show a cross-section image of an object, an isometric view of a generated composite model of the object, and a side view image of the object displayed for a user on display interface 109 on device 108 based on a generated composite model and a physical displacement of device 108 positioned by a user. For example, example screenshot 600 includes interactive graphical windows of a cross-section view of an object, a side view of an object, and a 3D rendering of a composite model generated by layering program 104. In this example, interactive graphical window 610 displays a cross section image of brain 602 with respect to coordinate system 604 oriented along a x-y plane; interactive graphical window 612 displays an isometric view of brain 602 with respect to coordinate system 604 oriented in an isometric perspective based on the generated composite model of brain 602; and interactive graphical window 614 displays a side view of brain 602 with respect to coordinate system 604 oriented along a y-z plane based on the generated composite model of brain 602.

In another example, layering program 104 displays an image among a plurality of images based on a physical displacement of a device. In this example, layering program 104 displays a cross-section image of brain 602 among a plurality of cross-section images of brain 602 based on a physical displacement of a device. In another example, layering program 104 displays an isometric view of the object that is rotatable and translatable based on a generated composite model generated by layering program 104. In this example, layering program 104 displays an isometric view of brain 602 based on a composite model generated from a plurality of 2D cross-section images taken by a MRI scanning device. Furthermore, layering program 104 can display an isometric view of brain 602 that can be rotated along an axis of coordinate system 604 (i.e., along the x,y,z-axis) and/or moved translated along a geometric plane of coordinate system 604 by a user. In another example, layering program 104 can display a side view of brain 602 based on a composite model generated from a plurality of 2D cross-sections. In this example, layering program 104 displays a medial (i.e., side) view of brain 602 oriented along a y-z plane and is based on a composite model generated from a plurality of 2D cross-section images of a brain, wherein the cross-section images are images taken from a x-y plane perspective.

In another example, layering program 104 displays an interactive graphical window highlighting an interest point on a cross-section of an object. In this example, layering program 104 displays a cross-section image of brain 602 based on a physical displacement of a device. Furthermore, layering program 104 detects interest point 606 on the cross-section image of brain 602 and subsequently highlights interest point 606, wherein the highlight of interest point 606 can have a color scheme that draws attention to the user. In another example, layering program 104 can display a location of cross-section image of an object relative to a plurality of images of the object. In this example, layering program 104 displays a cross-section image of brain 602 within interactive graphical window 610 based on a physical displacement of a device positioned by a user. Furthermore, layering program 104 highlights cross-section 608 on the isometric view of brain 602 in interactive graphical window 612 based on the location of the cross-section image of brain 602 displayed in interactive graphical window 610 relative to the plurality of cross-section images of brain 602. Even furthermore, layering program 104 highlights cross-section 608 on the medial view of brain 602 in interactive graphical window 614 based on the location of the cross-section image of brain 602 displayed in interactive graphical window 610 relative to the plurality of cross-section images of brain 602.

Figure 7A:
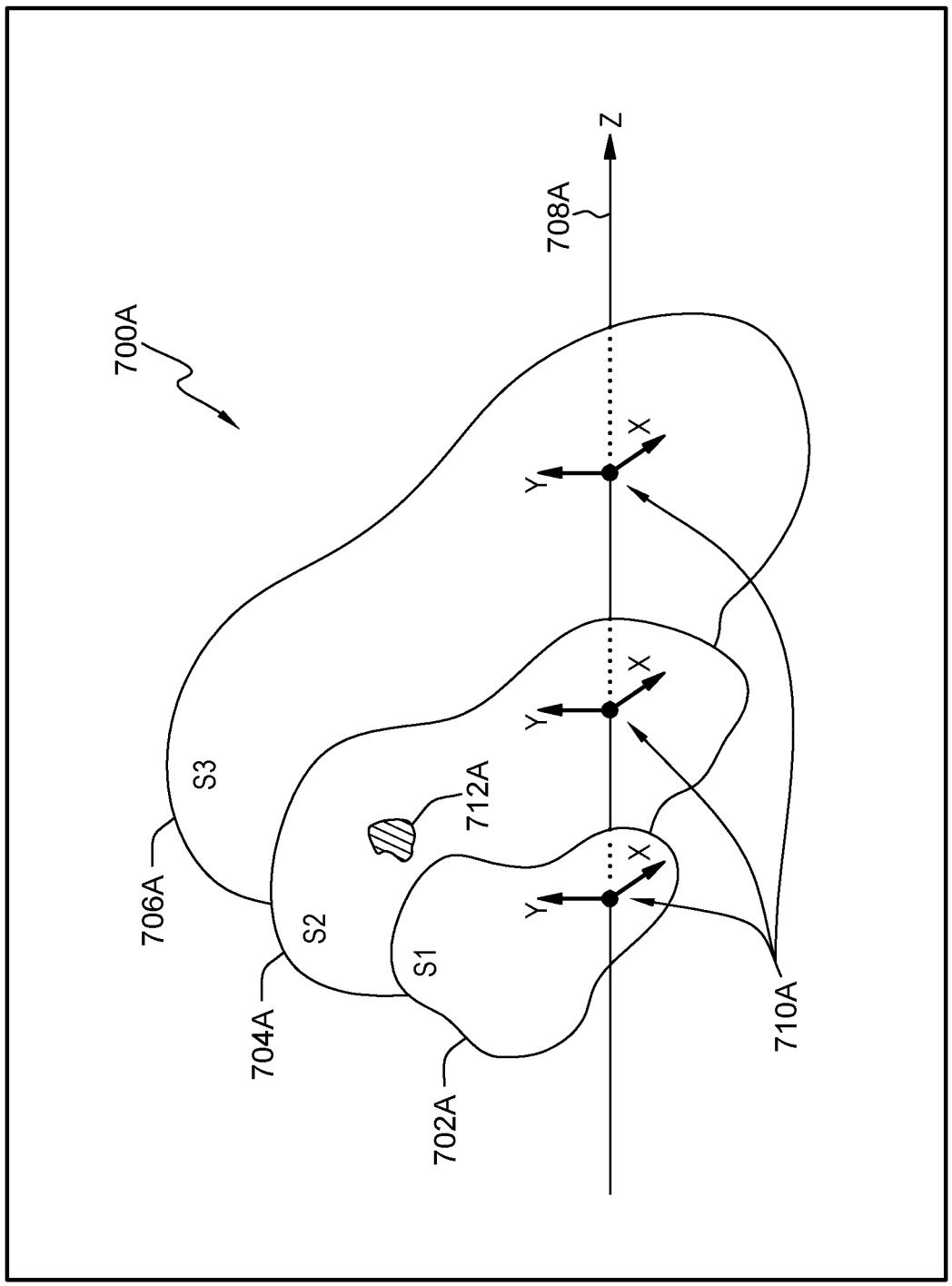
FIG. 7A is an example of various 2D images aligned as part of a composite model in a 3D environment, in accordance with an embodiment of the present invention.

FIG. 7A is an example of various 2D images aligned as part of a composite model in a 3D environment 700A, in accordance with an embodiment of the present invention.

In general, 3D environment 700A includes a plurality of 2D images are oriented and aligned in an abstract space as part of a composite model generated by layering program 104. For example, a plurality of 2D images are aligned and oriented along a common 2D coordinate system and are spaced relative to each other respective to the z-axis value assigned to each 2D image among the plurality of 2D images. In this example, slide (S1) 702A, slide (S2) 704A, and slide (S3) 706A are aligned to each common x-y coordinate system 710A assigned to each of the slides such that z-axis 708A intersects the origins of each common x-y coordinate system 710A. Furthermore, each 2D image has an assigned z-axis value such that each 2D image is spaced relative to each other respective to the assigned z-axis value. In this example, slide (S1) 702A has a z-axis value of z=0, slide (S2) 704A has a z-axis value of z=2, and slide (S3) 706A has a z-axis value of z=4. In another example, a set of 2D images among a plurality of 2D images can have a set of interest points assigned to the corresponding set of 2D images among the plurality of 2D images. In this example, interest point 712A is assigned to a location on slide (S2) 704A.

Figure 7B:
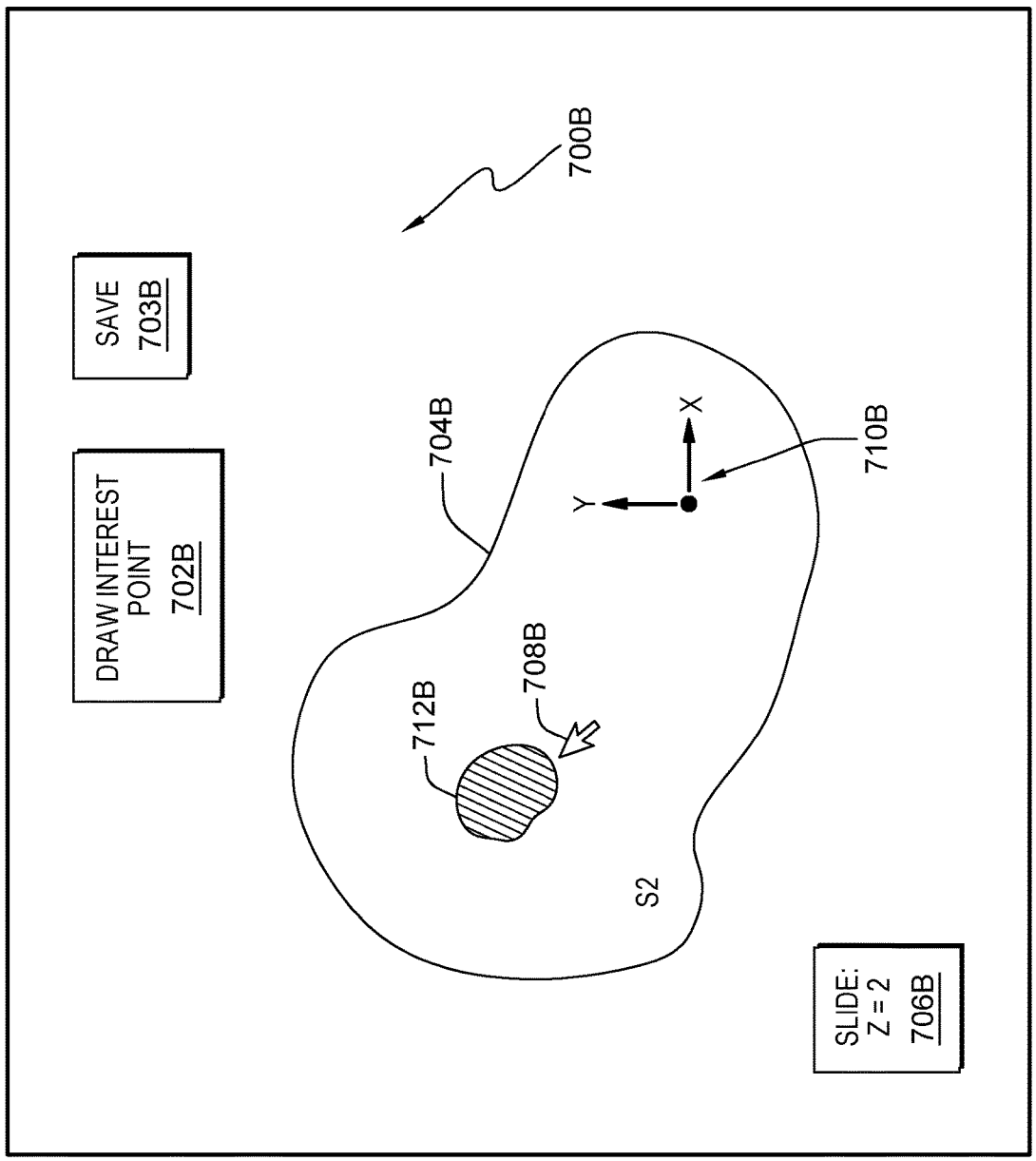
FIG. 7B is an example screenshot of an interactive graphical window displaying a 2D image for designating an interest point, in accordance with an embodiment of the present invention.

FIG. 7B is an example screenshot of an interactive graphical window 700B displaying a 2D image for designating an interest point, in accordance with an embodiment of the present invention.

In general, layering program 104 can display on display interface 109 via browser application 112 an interactive graphical window 700B that allows a user to select an 2D image among a plurality of 2D images, and to allow the user to designate a location on the selected 2D image as an interest point. For example, a user navigating through the plurality of 2D images selects a 2D image among the plurality of 2D images for display via browser application 112. In this example, a user navigating through the plurality of 2D images of environment 700A selects slide (S2) 704A for display, and layering program displays slide (S2) 704A in an interactive graphical window 700B via browser application 112.

In general, interactive graphical window 700B of browser application 112 includes a 2D image, a set of interactive graphical icons, a coordinate system, and a text field. For example, interactive graphical window 700B can display a 2D image among a plurality of 2D images, wherein the 2D image is selected by a user. In this example, interactive graphical window 700B displays slide (S2) 704B (i.e., slide (S2) 704A) selected by a user. In another example, interactive graphical window 700B can display an interactive graphical icon that, when selected by a user, toggles a cursor function that allows a user to select a region on the 2D image to be designated as an interest point. In this example, a user selects interactive graphical icon 702B labeled "Draw interest point", subsequently toggling a function for cursor 708B that allows the user to draw a region to be designated as an interest point. In another example, interactive graphical window 700B can display an enclosed region drawn by a user. In this example, upon selecting interactive graphical icon 702B, the user directs cursor 708B to a location on slide (S2) 704B and draws enclosed region 712B with cursor 708B. In response to detecting an enclosed region has been drawn by the user, layering program 104 highlights (e.g., cross-hatching or a color selected by a user) the enclosed region. In another example, interactive graphical window 700B displays an interactive graphical icon that the user can select that saves the enclosed region drawn by the user as an interest point corresponding to the 2D image selected by the user. In this example, selection of interactive graphical icon 703B labeled as "Save" saves enclosed region 712B as an interest point corresponding to slide (S2) 704B. In another example, interactive graphical window 700B displays a text field that indicates a location of the 2D image relative the plurality of 2D images. In this example, text field 706B with the text "Slide: z=2" indicates that slide (S2) 704B is located at a z-axis value at z=2. In another example, interactive graphical window 700B can display a coordinate system that indicates orientation of the 2D image. In this example, coordinate system 710B indicates x and y dimensions assigned to the 2D image.

Figure 8:
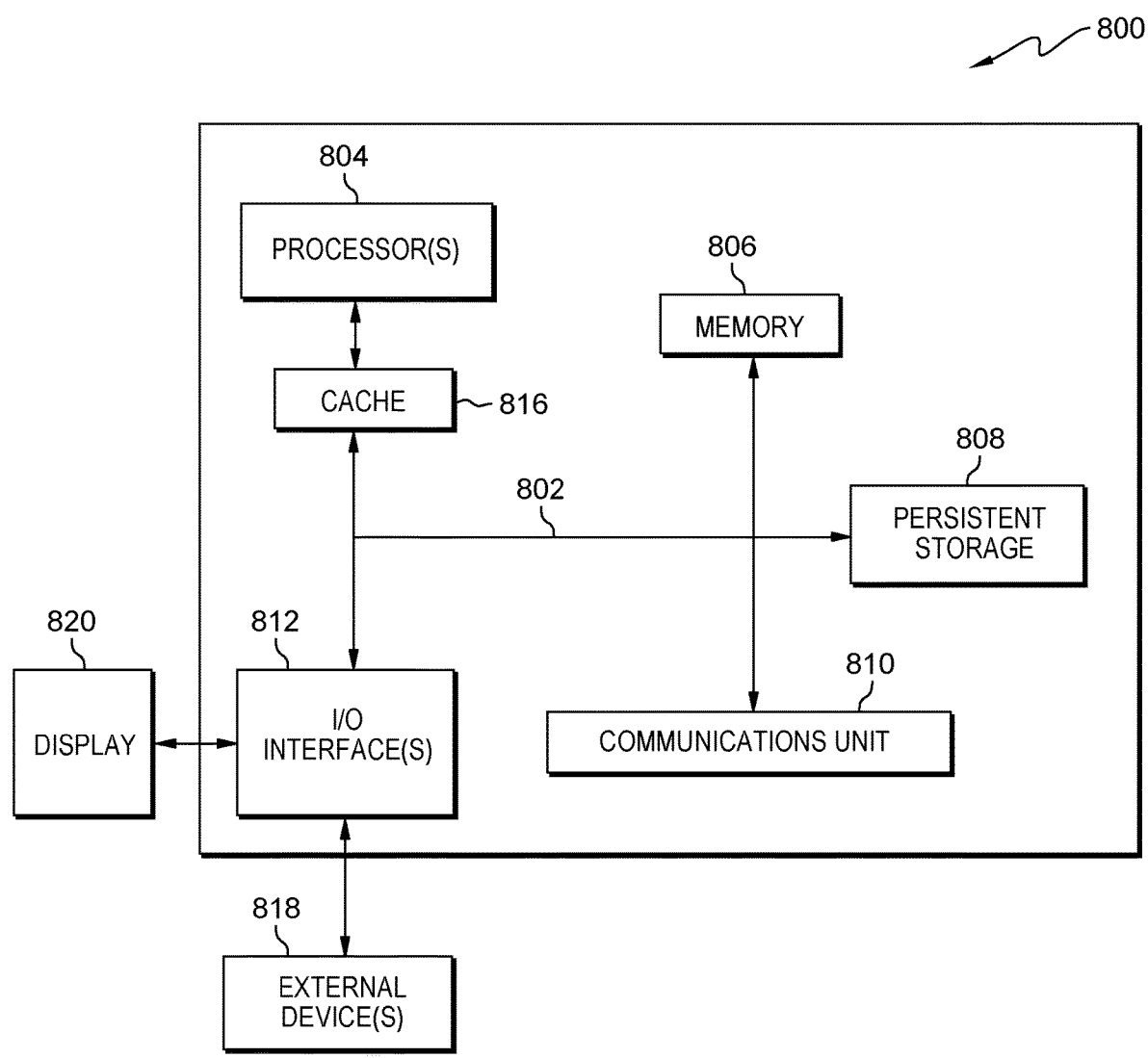
FIG. 8 depicts a block diagram of components of the computing systems of FIG. 1, in accordance with an embodiment of the present invention.

FIG. 8 depicts a block diagram of components of computing systems within haptic display environment 100 of FIG. 1, in accordance with an embodiment of the present invention. It should be appreciated that FIG. 8 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 800 includes communications fabric 802, which provides communications between cache 816, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses or a crossbar switch.

Memory 806 and persistent storage 808 are computer readable storage media. In this embodiment, memory 806 includes random access memory (RAM). In general, memory 806 can include any suitable volatile or non-volatile computer readable storage media. Cache 816 is a fast memory that enhances the performance of computer processor(s) 804 by holding recently accessed data, and data near accessed data, from memory 806.

Layering program 104 may be stored in persistent storage 808 and in memory 806 for execution by one or more of the respective computer processors 804 via cache 816. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. Layering program 104 may be downloaded to persistent storage 808 through communications unit 810.

I/O interface(s) 812 allows for input and output of data with other devices that may be connected to server computer 102, device 108, and/or positional instruments 114. For example, I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention, e.g., Layering program 104, can be stored on such portable computer readable storage media and can be loaded onto persistent storage 808 via I/O interface(s) 812. I/O interface(s) 812 also connect to a display 820.

Display 820 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
generating a composite model comprising a collected plurality of images, wherein each image among the collected plurality of images has an image that spans across a first and a second and an assigned value associated with a third dimension; and
determining an image of the generated composite model that serves as the image displayed in a starting position of a device based on a physical displacement of the device with respect to a reference position of the device and the generated composite model, wherein determining the image further comprises:
determining a range of displacement of the device;
mapping the generated composite model to the determined range of displacement;
identifying a location of the device within the range of displacement; and
identifying an image among the collected plurality of images corresponding to the identified location of the device within the range of displacement based on the mapped composite model.

2. The computer-implemented method of claim 1, further comprising:
displaying the determined image of the generated composite model corresponding to the starting position for the device; and
generating haptic feedback based on metadata associated with the displayed image.

3. The computer-implemented method of claim 2, wherein the determined image is displayed on a display interface integrated with the device, wherein a haptic device receives the generated haptic feedback that is integrated with the device.

4. The computer-implemented method of claim 2 wherein the determined image is displayed on a display interface integrated with the device, the device is attached to a cantilever arm comprising:
a first servomechanism connected to a foundation,
a strut having a first end and a second end, wherein the first end is operatively connected to the first servomechanism and the second end is operatively connected to a second servomechanism, wherein the second servomechanism includes an attachment point for the device,
wherein the first and the second servomechanism includes force-feedback mechanisms, generate haptic feedback, and measure joint angles of the cantilever arm.

5. The computer-implemented method of claim 1, wherein a third dimension is selected from a group consisting of time, distance, and wavelength.

6. The computer-implemented method of claim 1, wherein determining a range of displacement of the device and identifying a location of the device within the range of displacement is based on video footage of the device or a user.

7. A computer program product comprising:
one or more computer readable storage media and program instructions stored on the one or more computer readable storage media, the program instructions comprising:
program instructions to generate a composite model comprising a collected plurality of images, wherein each image among the collected plurality of images has an image that spans across a first and a second and an assigned value associated with a third dimension; and
program instructions to determine an image of the generated composite model that serves as the image displayed in a starting position of a device based on a physical displacement of the device with respect to a reference position of the device and the generated composite model wherein the program instructions to determine the image further comprise instructions to:
determine a range of displacement of the device;
map the generated composite model to the determined range of displacement;
identify a location of the device within the range of displacement; and
identify an image among the collected plurality of images corresponding to the identified location of the device within the range of displacement based on the mapped composite model.

8. The computer program product of claim 7, further comprising:
program instructions to display the determined image of the generated composite model corresponding to the starting position for the device; and
program instructions to generate haptic feedback based on metadata associated with the displayed image.

9. The computer program product of claim 8, wherein the determined image is displayed on a display interface integrated with the device, wherein a haptic device receives the generated haptic feedback that is integrated with the device.

10. The computer program product of claim 8 wherein the determined image is displayed on a display interface integrated with the device, the device is attached to a cantilever arm comprising:
a first servomechanism connected to a foundation,
a strut having a first end and a second end, wherein the first end is operatively connected to the first servomechanism and the second end is operatively connected to a second servomechanism, wherein the second servomechanism includes an attachment point for the device,
wherein the first and the second servomechanism includes force-feedback mechanisms, generate haptic feedback, and measure joint angles of the cantilever arm.

11. The computer program product of claim 7, wherein a third dimension is selected from a group consisting of time, distance, and wavelength.

12. The computer program product of claim 7, wherein the program instructions to determine a range of displacement of the device and identifying a location of the device within the range of displacement is based on video footage of the device or a user.

13. A computer system comprising:
one or more computer processors;
one or more computer readable storage media; and
program instructions stored on the one or more computer readable storage media for execution by at least one of the one or more processors, the program instructions comprising:
program instructions to generate a composite model comprising a collected plurality of images, wherein each image among the collected plurality of images has an image that spans across a first and a second and an assigned value associated with a third dimension; and
program instructions to determine an image of the generated composite model that serves as the image displayed in a starting position of a device based on a physical displacement of the device with respect to a reference position of the device and the generated composite model wherein the program instructions to determine the image further comprise instructions to:

determine a range of displacement of the device;

map the generated composite model to the determined range of displacement;

identify a location of the device within the range of displacement; and identify an image among the collected plurality of images corresponding to the identified location of the device within the range of displacement based on the mapped composite model.

14. The computer system of claim 13, further comprising:

program instructions to display the determined image of the generated composite model corresponding to the starting position for the device; and program instructions to generate haptic feedback based on metadata associated with the displayed image.

15. The computer system of claim 14, wherein the determined image is displayed on a display interface integrated with the device, wherein a haptic device receives the generated haptic feedback that is integrated with the device.

16. The computer system of claim 14 wherein the determined image is displayed on a display interface integrated with the device, the device is attached to a cantilever arm comprising:

a first servomechanism connected to a foundation, a strut having a first end and a second end, wherein the first end is operatively connected to the first servomechanism and the second end is operatively connected to a second servomechanism, wherein the second servomechanism includes an attachment point for the device, wherein the first and the second servomechanism includes force-feedback mechanisms, generate haptic feedback, and measure joint angles of the cantilever arm.

17. The computer system of claim 13, wherein a third dimension is selected from a group consisting of time, distance, and wavelength.

* * * * *